Figure 1:
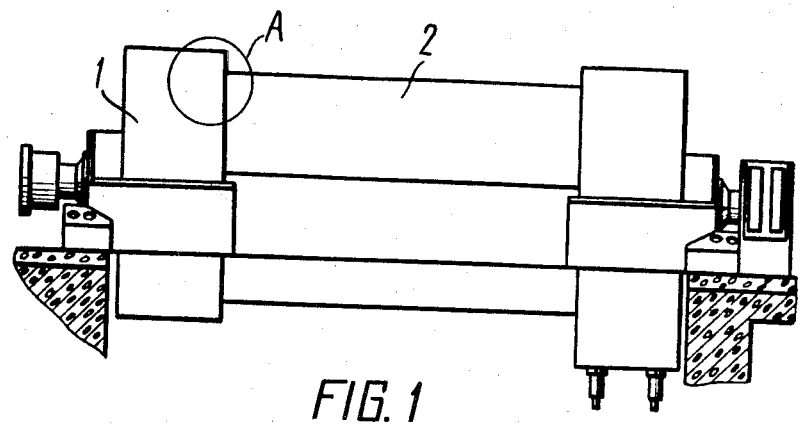

United States Patent
Konovalov et al.

[15] 3,683,221
[45] Aug. 8, 1972

[54] STATOR OF AN ELECTRIC MACHINE

[72] Inventors: Boris Leonidovich Konovalov, 603 mikroraion, 1, kv. 346; Boris Volkovich Spivak, ulitsa Kosiora, 56, kv. 55; Evgeny Khaimovich Glider, prospekt Ordzhonikidze, 18, kv. 55; Oleg Borisovich Gradov, ulitsa Kosiora, 6, kv. 1; David Bentsionovich Karpman, ulitsa Frantisheka Krala, 49, kv. 54; Vasily Semenovich Kildishev, ulitsa Plekhanovskaya, 41/43, kv. 55; Lazar Yankelevich Stanislavsky, ulitsa Mayakovskogo, 11, kv. 24, all of Kharkov, U.S.S.R.

[22] Filed: Jan. 7, 1971

[21] Appl. No.: 104,719

[52] U.S. Cl. ................................................310/258
[51] Int. Cl. ................................................H02k 1/18
[58] Field of Search..........310/55, 57, 258, 259, 216, 310/217, 254

[56] References Cited

UNITED STATES PATENTS

| 1,685,742 | 9/1928 | George | 310/217 X |
| 2,489,109 | 11/1949 | Shildnedt et al. | 310/57 |
| 3,571,635 | 3/1971 | Turner | 310/258 X |

Primary Examiner—D. F. Duggan
Attorney—Waters, Roditi, Schwartz & Nissen

[57] ABSTRACT

The present invention relates to electric machines and in particular, to gas filled stators of electric machines.

The concept of the invention consists in that the stator of the electric machine comprising end pieces and a middle section with a core compressed with bracing ribs and pressure flanges is designed so that the end pieces of the stator are joined to the middle section with the use of the pressure flanges of the stator core.

5 Claims, 2 Drawing Figures

PATENTED AUG 8 1972 3,683,221

STATOR OF AN ELECTRIC MACHINE

The present invention relates to electric machines and, in particular, to gas filled stators of electric machines.

Known in the art are stators comprising a middle section and two end pieces that are connected to the middle section either rigidly or by elastic members.

Stators of such electric machines are fixed along their total lengths and filled with a cooling or an inert gas.

The general disadvantage of this manner of joining end pieces with the middle section of the body of an electric machine stator is that it requires the middle section of the body to be provided with a gastight shell. The use of this shell increases considerably the weight of the middle section of the stator and makes its structure quite complex.

An object of the present invention is to obviate this disadvantage.

A more specific object of the invention is to provide a means which, while preserving the airtightness of the joint between the middle section of the stator body and its end pieces, will make it possible to provide stators with less complex and less heavy structures.

These objects are attained in the stator of an electric machine comprising end pieces and the middle section with a core compressed with bracing ribs and pressure flanges, in which, according to the invention, the end pieces are joined to the middle section by means of pressure flanges of the core of the stators.

This arrangement makes it possible to use the body of the stator core as a gastight shell and, therefore, to simplify the structure of the stator and reduce its weight.

To make the inner cavity of the stator body airtight it is preferable that sealing spacers be fixed in the areas where the bracing ribs pass through the flanges and at the points where pressure flanges are joined to the stator core.

Figure 2:
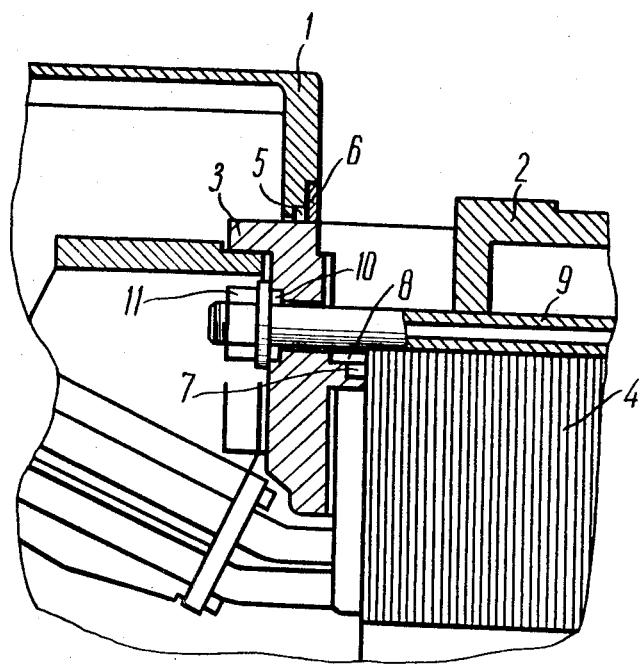

Given below is a detailed description of a preferred embodiment of an electric machine stator according to the invention with reference to the accompanying drawings, in which:

FIG. 1 is a side view of an electric machine having a stator whose body consists of a middle section and two end pieces; and FIG. 2 is an enlarged sectional view of detail A of FIG. 1 showing the joint between an end piece of the stator body and the middle section according to the invention.

An end piece (FIG. 1) of stator body 2 is joined to a pressing flange 3 (FIG. 2) of stator core 4 by means of a sealing spacer 5. This spacer is pressed against the pressure flange 3 and the end piece 1 circumferentially by straps 6 to ensure an airtight joint. The joint between the pressure flange 3 and the stator core 4 which is glued along its total length is made airtight with the use of a sealing spacer 7 pressed circumferentially against the pressure flange 3 and the stator core 4 with straps 8.

The areas where bracing ribs 9 pass through the pressure flange 3 are made airtight by the use of sealing spacers 10 which are pressed against the bracing ribs 9 and the pressure flange 3 by 11.

What we claim is:
1. A stator of an electric machine comprising a middle section; end pieces; and means joining the end pieces to the middle section; said middle section including a core, and bracing means and pressure flanges compressing said core, said means joining the end pieces to the middle section via said pressure flanges.

2. A stator as claimed in claim 1 in which said means includes sealing spacers between said end pieces and the pressure flanges and between the pressure flanges and the core.

3. A stator as claimed in claim 2 comprising additional sealing spacers between said bracing means and said pressure flanges.

4. A stator as claimed in claim 3 wherein said bracing means comprises threaded bracing ribs passing through said pressure flanges, and nuts threaded on said ribs to press the flanges against said core.

5. A stator as claimed in claim 1 wherein said stator core is held together by glue applied along its entire length, said bracing means comprising bracing ribs passing through said pressure flanges.

* * * * *